US012750813B1

(12) United States Patent
Liu

(10) Patent No.: US 12,750,813 B1
(45) Date of Patent: Sep. 29, 2026

(54) IN-BUILDING LOCALIZATION USING DEVICE RADIO FREQUENCY FINGERPRINTS

(71) Applicant: Amazon Technologies, Inc., Seattle, WA (US)

(72) Inventor: Jungtao Liu, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 410 days.

(21) Appl. No.: 18/374,938

(22) Filed: Sep. 29, 2023

(51) Int. Cl.

| | |
|---|---|
| ***H04W 4/02*** | (2018.01) |
| ***G01S 5/02*** | (2010.01) |
| ***H04B 17/318*** | (2015.01) |
| ***H04W 4/33*** | (2018.01) |
| ***H04W 64/00*** | (2009.01) |

(52) U.S. Cl.
CPC ....... *H04W 64/003* (2013.01); *G01S 5/02525* (2020.05); *H04B 17/318* (2015.01); *H04W 4/023* (2013.01); *H04W 4/33* (2018.02)

(58) Field of Classification Search
None
See application file for complete search history.

(56) References Cited

U.S. PATENT DOCUMENTS

2013/0223261 A1* 8/2013 Aggarwal ................. G01S 5/10 370/252
2013/0281111 A1* 10/2013 Syrjarinne .............. G01S 5/014 455/456.1
2014/0141796 A1* 5/2014 Marti ................... G01C 21/206 455/456.1
2014/0308976 A1* 10/2014 Garin .................... H04W 4/023 455/456.2

OTHER PUBLICATIONS

Seidel et al.; "The impact of surrounding buildings on propagation for wireless in-building personal communications system design"; IEEE Vehicular Technology Society 42nd VTS Conf.—Frontiers of Technology; 1992; p. 814-818.
"Propagation data and prediction methods for the planning of indoor radiocommunication systems and radio local area networks in the frequency range 300 MHz to 450 GHz"; P Series Radiowave propagation; International Telecommunication Union; Sep. 2021; 29 pages.

* cited by examiner

*Primary Examiner* — Idowu O Osifade
(74) *Attorney, Agent, or Firm* — BakerHostetler

(57) ABSTRACT

Radio frequency fingerprints may be received, for a plurality of computing devices, comprising indications of detected wireless access points and signal strengths of the detected wireless access points. Access point distances between a plurality of wireless access points may be computed based on the radio frequency fingerprints. One or more neighboring wireless access point pairs may be detected, based on the radio frequency fingerprints, each including two wireless access points that are detected by a same computing device. One or more relative positions may be determined of one or more of the plurality of wireless access points relative to one or more other of the plurality of wireless access points based on the access point distances and the one or more neighboring wireless access point pairs. A location-based operation may be performed based at least in part on the one or more relative positions.

20 Claims, 12 Drawing Sheets

IN-BUILDING LOCALIZATION USING DEVICE RADIO FREQUENCY FINGERPRINTS

BACKGROUND

Device localization using radio frequency (RF) fingerprints has become a major area of interest with the explosion of small cell cellular base stations and the publicly deployed wireless fidelity (WI-FI) network. These widely deployed, fully managed wireless networking infrastructures constantly broadcast beacons that can be picked up as fingerprints that are both reliable and invariant. The reduced range of these small cells and the enterprise grade WI-FI access point provide a fine grain resolution that was not possible a few years ago. The success in the fingerprinting algorithms for outdoor localization does not carry over to in-building environment. The main blockers for the adoption of the RF fingerprinting technology for in-building localization include a lack of managed WI-FI or cellular infrastructure. Additionally, even when these infrastructure do exist, it is often inside a private property where access is restricted. Additionally, the need to perform site survey to collect fingerprints may also be problematic within a private building.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
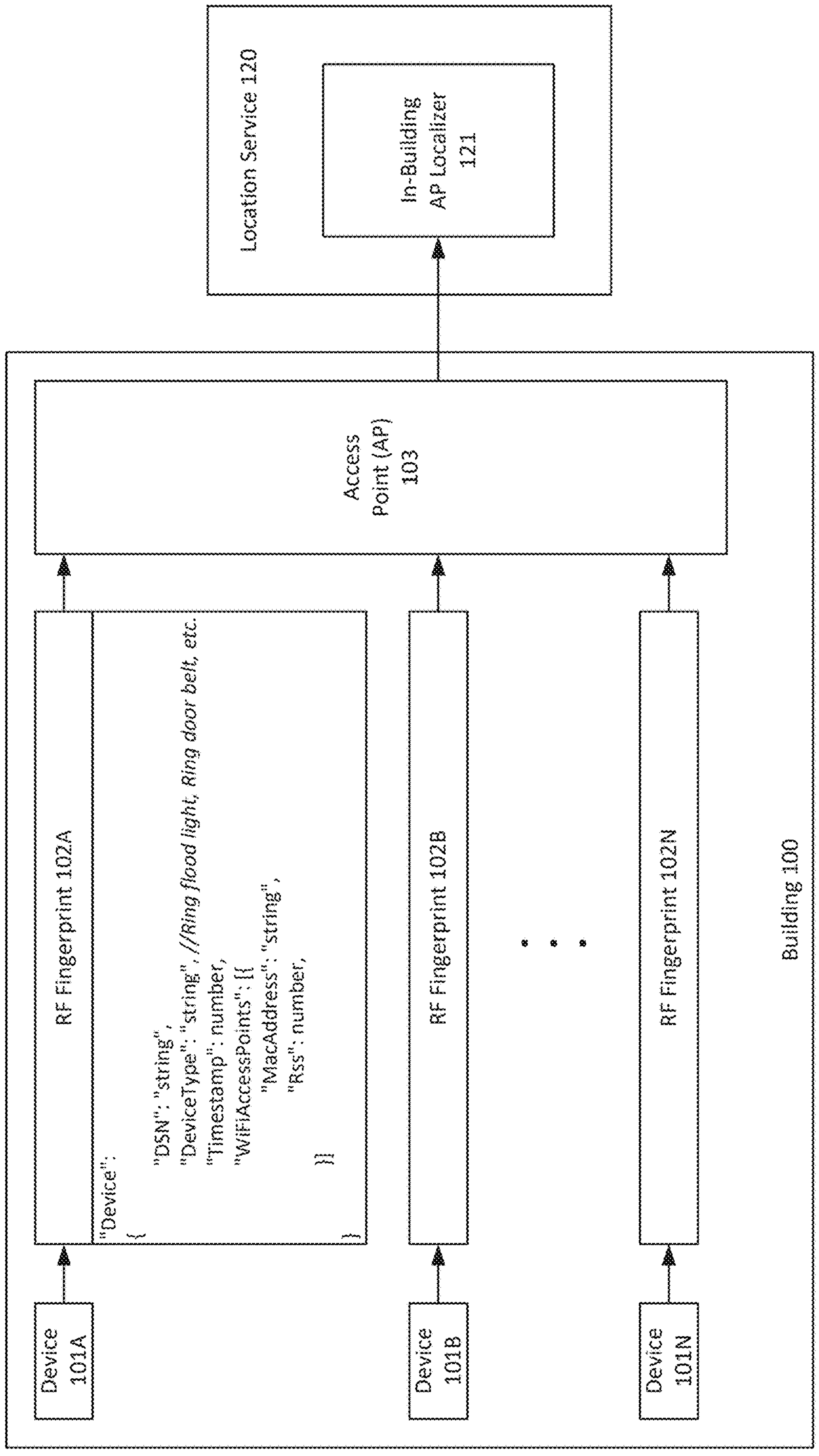
FIG. 1 is a diagram illustrating an example in-building fingerprint collection and analysis system that may be used in accordance with the present description.

Techniques for in-building localization using device radio frequency (RF) fingerprints are described herein. A location service may receive device RF fingerprint information for a plurality of computing devices. The device RF fingerprint information for a given computing device may include indications of wireless (e.g., wireless fidelity (WI-FI)) access points that are detected by the computing device as well as a received signal strength (RSS) value for each detected access point. The plurality of computing devices may include devices that are typically located inside a building and that may be placed at stationary locations for extended periods of time. In one specific example, this may include voice-operated personal assistant devices. In addition to device fingerprint information, group information may be received for the plurality of computing devices. The group information may include information that allows the computing devices to be grouped according to a criterion. For example, in some cases, the group information may include device registration information and/or account information, and the device groups may correspond to accounts of owners of the devices. For example, the computing devices may be divided into groups, with each group corresponding to a respective account and including computing devices that belong to (e.g., are registered to) the respective account. In one specific example, when registering a computing device, a device owner may register the device to the owner's respective account with an online marketplace or other goods purchasing and delivery service.

The device RF fingerprint information may be used to calculate access point distances between a plurality of wireless access points that are detected by the plurality of computing devices. Specifically, the RSS values for each access point may be used to compute an estimated distance between each device and the wireless access points detected by the device. The estimated device-to-access point distances may then be used to determine a closest computing device to each access point and to determine a minimum device distance, which is the distance between a wireless access point and its closest computing device. Additionally, an average minimum device distance may be computed, which is the average distance between an access point and each device that satisfies a distance constraint for the access point. The devices that satisfy the distance constraint include the closest device to the access point and all other devices whose distance to the access point does not exceed the minimum device distance by more than a configurable threshold distance. Furthermore, a normalized device distance between a given access point and a given device may be computed by dividing the estimated distance between the device and the access point by the average minimum device distance for the access point. An estimated distance between first and second access points may then be computed based on the normalized device distances. In particular, the estimated distance between access points may be calculated as an average of the sum of the normalized device distances from the second access point for devices that satisfy the distance constraint for the first access point and the sum of the normalized device distances from the first access point for devices that satisfy the distance constraint for the second access point. The device RF fingerprint information may also be used to detect neighboring access points. Neighboring access points, as that term is used herein, refers to a pair of access points that are both detected by a common computing device.

The access point distance information and the detected neighboring access points may be used to compute relative positions between the wireless access points. First, a set of access points may be determined that are co-located on a single floor of a building. In some examples, this may be determined based on device registration and/or account information, which may include a floor number or another number (e.g., apartment number) that is indicative of a floor number. For a set of access points on the same floor, an access point edge graph may be generated that shows neighboring access points using edges that connect each pair of neighboring access points. The access point edge graph may then be used to calculate an access point position graph. Specifically, a selected access point may be determined that has a most neighboring access points of all of the plurality of access points in the set of access points. The selected access point may then be placed at a selected position (e.g., the origin) of the access point position graph. A first neighbor wireless access point may then be determined that has a most neighboring wireless access points of all neighbors of the selected wireless access point. The first neighbor wireless access point may be placed at a first position on the access point location graph. A first graph distance between the selected position and the first position may be representative of a first actual distance between the selected wireless access point and the first neighbor wireless access point.

A second neighbor wireless access point may then be determined that has a next-most (e.g., second-most) neighboring wireless access points of all the neighbors of the selected wireless access point. It may then be determined whether the second neighbor wireless access point neighbors the first neighbor wireless access point. The second neighbor wireless access point may then be placed at a second position on the access point position graph based on whether the second neighbor wireless access point neighbors the first neighbor wireless access point. A second graph distance between the selected position and the second position is representative of a second actual distance between the selected wireless access point and the second neighbor wireless access point.

If the second neighbor wireless access point doesn't neighbor the first neighbor wireless access point, then the second position may be determined as follows. Specifically, a first circle may be computed that surrounds the selected wireless access point at the second graph distance. Additionally, a second circle may be computed that surrounds the first neighbor wireless access point at a third graph distance representative of a furthest distance between the first neighbor wireless access point and all of its neighboring wireless access points. The second position may then be selected as a point on the first circle that is on a portion of the first circle that is not within the second circle.

By contrast, if the second neighbor wireless access point neighbors the first neighbor wireless access point, then the second position may be determined as follows. Specifically, a first circle may be computed that surrounds the selected wireless access point at the second graph distance. Additionally, a second circle may be computed that surrounds the first neighbor wireless access point at a third graph distance representative of a third actual distance between the first neighbor wireless access point and the second neighbor wireless access point. The second position may then be selected as one of two points of intersection between the first circle and the second circle.

The above-described neighbor placement techniques may be repeated for all neighboring access points of the selected access point that have at least two neighbors, then for a new selected access point and all its neighbors having at least two neighbors, and then finally for all access points having only one neighbor. The resulting access point position graph may then be used to compute a relative position between the wireless access points that are placed on the graph. Specifically, in some examples, the relative position may be expressed using clock-number positions (e.g., from zero to twelve). The above process may then be repeated for each floor of a multi-story building, such as to construct a three-dimensional lattice representing the multi-story building. The three-dimensional lattice may include a plurality of horizontal slices, with each horizontal slice representing a respective floor/story of the multi-story building. Furthermore, in some examples, access point positions may be refined based on pairs of cross-floor neighboring access points, which are two neighboring access points on different floors of a building. Moreover, in some examples, access point positions may be refined based on a true north or other known location, such as in scenarios in which one or more in-building access points neighbor a public access point or other access point with a known location. In some examples, access point positions may be computed and expressed using three-dimensional coordinate values.

The calculated in-building access point locations may be used to perform a variety of location-based operations associated with a computing device group. In one specific example, the in-building access point locations may be used to guide a visitor, such as a delivery person, throughout a building. For example, for each package to be delivered inside a building, the location service may use the access point position information to project where in the building the respective delivery address falls. In some examples, the delivery person may operate a handheld device that may repeatedly scan and update the surrounding wireless environment and provide a list of detected access points to the location service. The location service may then use the list of detected access points to locate the delivery person's current location within the building. The location service may guide the delivery person to the proper building entrance. For example, the location service may send an instruction to the delivery person, e.g., "the delivery entrance is at the South-East side of the building, which is at your 5 clock, roughly 10 meters away." As the delivery person moves inside the building, the delivery person's physical pathway may be identified between the device groups by the location service to further refine or build the physical pathways on the three-dimensional lattice. In some examples, the location service may instruct the delivery person when to turn and in which direction to turn. Also, in some examples, the location service may indicate a position for a delivery address relative to the delivery person's current position, such as a clock-number direction, a distance, and a number of floors away.

FIG. 1 is a diagram illustrating an example in-building fingerprint collection and analysis system that may be used in accordance with the present description. In the example of FIG. 1, devices 101A-N are computing devices from which RF fingerprints 102A-N, respectively, are obtained via access point 103. Access point (AP) 103 is a wireless (e.g., WI-FI) access point. The RF fingerprints are obtained by in-building AP localizer 121 of location service 120. The RF fingerprints may be transmitted from access point 103 to in-building AP localizer 121 via one or more networks, for example including the Internet. Some example contents of RF fingerprint 102A are shown in FIG. 1. In this example, RF fingerprint 102A includes a device identifier, which is a device serial number (DSN) from device 101A. RF fingerprint 102A also indicates a device type for device 101A. RF fingerprint 102A also includes a timestamp indicating a time at which the RF fingerprint 102A is generated. RF fingerprint 102A also includes a list of detected access points. For each detected access point, a media access control (MAC) address is indicated. Also, for each detected access point, an RSS number value is provided that indicates the received signal strength from the access point that is received by the device 101A. The term RF fingerprint, as used herein, refers to information including at least indications of detected access points and indications of received signal strengths.

Figure 2:
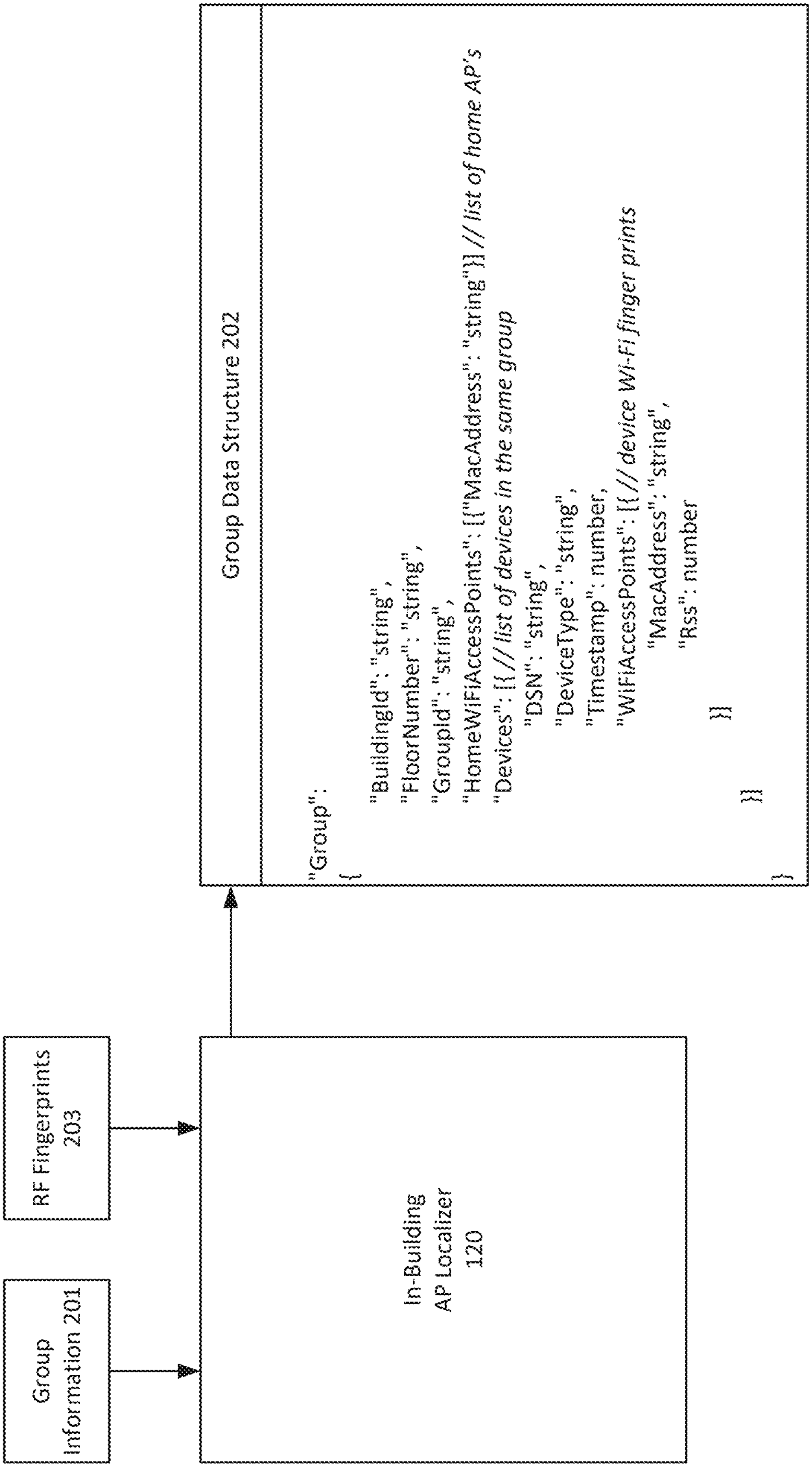
FIG. 2 is a diagram illustrating example device group data may be used in accordance with the present description.

Referring now to FIG. 2, it is shown that in-building AP localizer 121 may receive RF fingerprints 203, which may include RF fingerprints 102A-N of FIG. 1 and any number of other RF fingerprints. In addition to RF fingerprints 203, in-building AP localizer 121 may also receive group information 201 for a plurality of computing devices. The group information 201 may include information that allows the computing devices to be grouped according to a criterion. In some cases, the group information 201 may include device registration information and/or account information, and the device groups may correspond to accounts of owners of the devices. For example, the computing devices may be divided into groups, with each group corresponding to a respective account and including computing devices that belong to (e.g., are registered to) the respective account. In one specific example, when registering a computing device, a device owner may register the device to the owner's respective account with an online marketplace or other goods purchasing and delivery service. The in-building AP localizer 121 may use the RF fingerprints 203 and the group information 201 to divide computing devices into groups. The in-building AP localizer 121 may also generate a group data structure 202 for each group that includes data for the corresponding group. Detected access points may also be assigned to the groups. For example, if a given computing device sends and receives data via a given access point, then that access point may be assigned to the same group as the given device.

Some example contents of group data structure 202 are shown in FIG. 2. In this example, group data structure 202 includes a building identifier (ID) and floor number for the group. For example, in some cases, group information 201 may include device registration information and/or account information, which may include a street address associated with an owner of the account. This information may be used to determine a building identifier and a floor number for an account to which the group corresponds. Specifically, a building identifier may map to a particular street address. Additionally, a street address may include a floor number or another number (e.g., apartment number) that is indicative of a floor number. The group data structure 202 also includes a group ID, which is an identifier for the corresponding group. The group data structure 202 also includes a list of home WI-FI access points, which are WI-FI access points that are assigned to the group (e.g., that belong to the account to which the group corresponds). The group data structure 202 also includes a list of each device that is included in the corresponding group. The group data structure 202 also includes RF fingerprint information for each device, including the device serial number (DSN), device type, timestamp for the RF fingerprint, and detected access point MAC address and signal strength.

Figure 3:
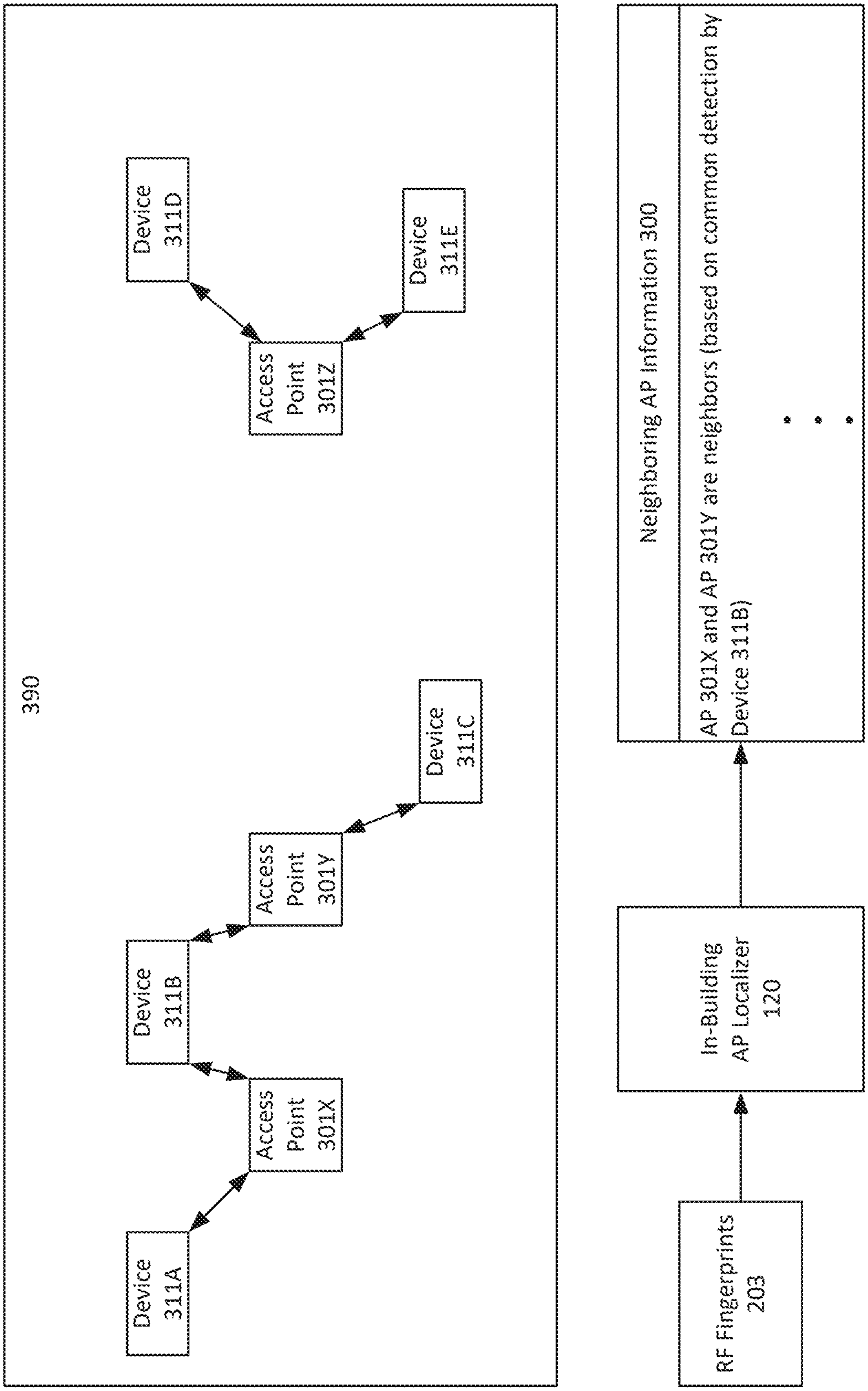
FIG. 3 is a diagram illustrating example neighboring access point information that may be used in accordance with the present description.

The RF fingerprints 203 may also be used to detect neighboring access points. Neighboring access points, as that term is used herein, refers to a pair of access points that are both detected by a common computing device. Referring now to FIG. 3, an example of neighboring wireless access points will be described in detail. In the example of FIG. 3, representation 390 is a diagram that depicts access point signal detection for devices 311A-E. As shown in representation 390, device 311A is able to detect access point 301X—but is unable to detect access points 301Y and 301Z. Device 311B is able to detect access points 301X and 301Y—but is unable to detect access point 301Z. Device 311C is able to detect access point 301Y—but is unable to detect access points 301X and 301Z. Devices 311D and 311E are able to detect access point 301Z—but are unable to detect access points 301X and 301Y. In the example of FIG. 3, these relationships may be indicated by RF fingerprints 203. Based on these relationships, in-building AP localizer 121 may determine that access points 301X and 301Y are neighbors because they are both detected by a common device (device 311B). An indication of this neighboring relationship between access points 301X and 301Y may be stored in neighboring AP information 300. Indications of other detected neighboring access points may also be stored in neighboring AP information 300. By contrast, access points 301X and 301Z are not neighboring access points because there is no single device that detects both access points 301X and 301Z. Additionally, access points 301Y and 301Z are not neighboring access points because there is no single device that detects both access points 301Y and 301Z.

The RF fingerprints 203 may also be used to calculate access point distances between a plurality of wireless access points that are detected by the plurality of computing devices. Specifically, the RSS values for each access point may be used to compute an estimated distance between each device and the wireless access points detected by the device. In particular, it is noted that there are known mathematical techniques for estimating an in-building distance between a wireless transmitter and receiver as a function of an RSS, a transmit power, and other case-specific information. As described above, the RSS value may be determined from the device's RF fingerprint. The transmit power of an access point may be estimated based on known access point transmission power information. Specifically, it is known that the typical transmit power ranges are approximately 5-30 decibel-milliwatts (dBm) for 2.4 gigahertz (GHz) transmitters and approximately 8-30 dBm for 5 GHz transmitters. The other case-specific information that may be used to estimate the distance may include, for example, a type of building material that is used, for which values may also be estimated based on known estimations for various building types (e.g., residential, office, etc.).

The estimated device-to-access point distances may then be used to determine a closest computing device to each access point and to determine a minimum device distance, which is the distance between a wireless access point and its closest computing device. Additionally, an average minimum device distance may be computed, which is the average distance between an access point and each device that satisfies a distance constraint for the access point. The devices that satisfy the distance constraint include the closest device to the access point and all other devices whose distance to the access point does not exceed the minimum device distance by more than a configurable threshold distance. Furthermore, a normalized device distance between a given access point and a given device may be computed by dividing the estimated distance between the device and the access point by the average minimum device distance for the access point.

Figure 4:
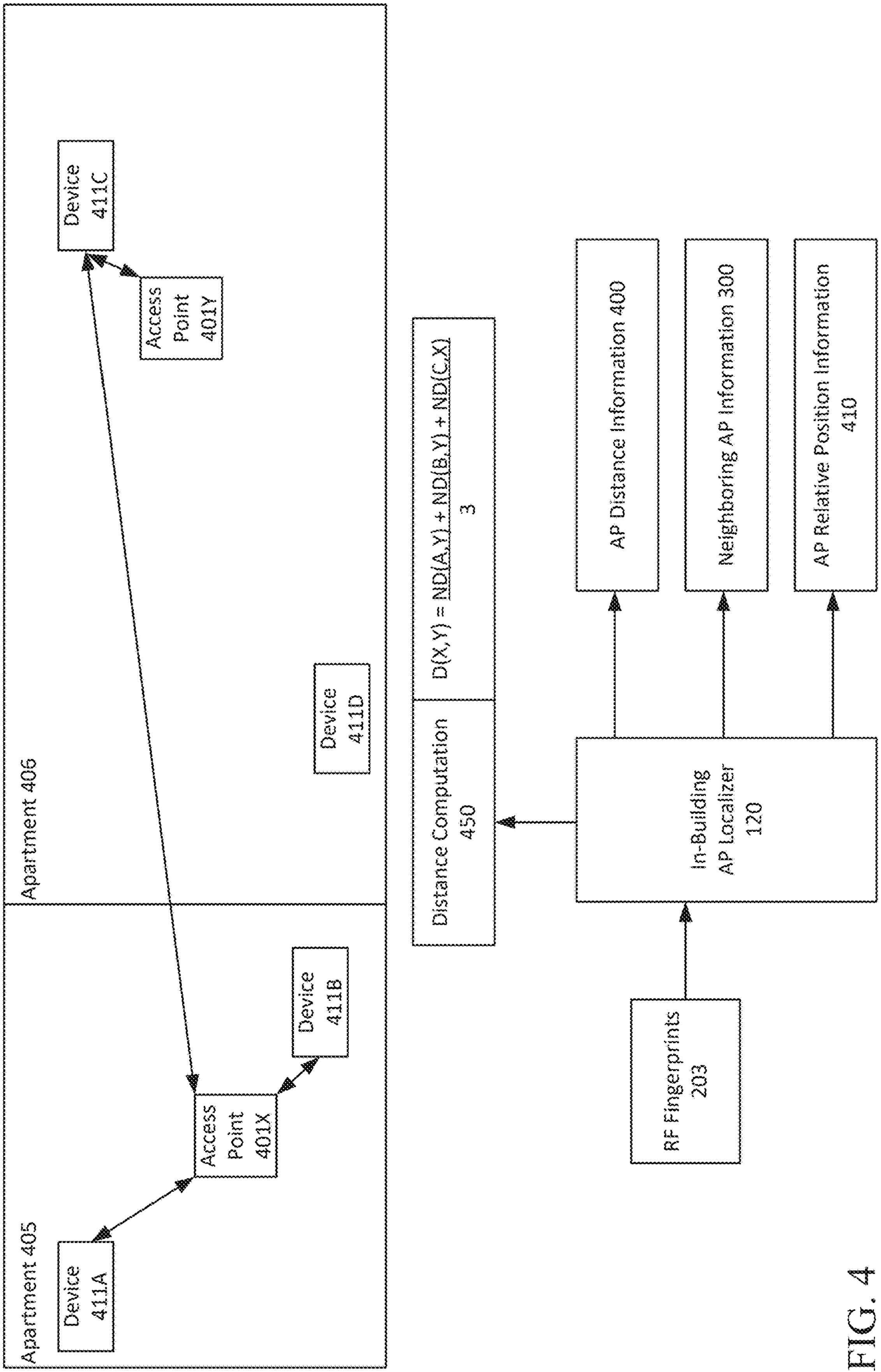
FIG. 4 is a diagram illustrating example access point distance computations that may be used in accordance with the present description.

An estimated distance between first and second access points may then be computed based on the normalized device distances. In particular, the estimated distance between access points may be calculated as an average of the sum of the normalized device distances from the second access point for devices that satisfy the distance constraint for the first access point and the sum of the normalized device distances from the first access point for devices that satisfy the distance constraint for the second access point. Referring now to FIG. 4, an example access point distance calculation is shown. In this example, apartment 405 includes devices 411A and 411B and access point 401X. Additionally, apartment 406 includes devices 411C and 411D and access point 401Y. In this example, device 411B is the closest device to access point 401X. Thus, the minimum device distance for access point 401X is the distance from access point 401X to device 411B. Device 411B satisfies the distance constraint for access point 401X because it is the closest device to access point 411X. Additionally, in this example, device 411A also satisfies the distance constraint for access point 401X because the distance from device 411A does not exceed the minimum device distance by more than the configurable threshold distance. Thus, in this example, devices 411A and 411B satisfy the distance constraint for access point 401X. By contrast, devices 411C and 411D do not satisfy the distance constraint for access point 401X. This is because the distances from each of devices 411C and 411D to access point 401X exceed the minimum device distance by more than the configurable threshold distance.

Additionally, device 411C is the closest device to access point 401Y. Thus, the minimum device distance for access point 401Y is the distance from access point 401Y to device 411C. Thus, in this example, device 411C satisfies the distance constraint for access point 401Y. By contrast, devices 411A, 411B and 411D do not satisfy the distance constraint for access point 401Y. This is because the distances from each of devices 411A, 411B and 411D to access point 401Y exceed the exceed the minimum device distance by more than the configurable threshold distance.

In distance computation 450 of FIG. 4, the distance between access points 401X and 401Y is represented by the notation D(X,Y). The normalized device distance (ND) between device 411A and access point 401Y is represented by the notation ND(A,Y). The normalized device distance (ND) between device 411B and access point 401Y is represented by the notation ND(B,Y). The normalized device distance (ND) between device 411C and access point 401X is represented by the notation ND(C,X). Thus, in this example, the distance between access points 401X and 401Y (which is D(X,Y)) is estimated as the an average of the sum of the normalized device distances from access point 401Y for devices that satisfy the distance constraint for the access point 401X (which includes ND(A,Y) and ND(B,Y)) and the sum of the normalized device distances from the access point 401X for devices that satisfy the distance constraint for the access point 401Y (which includes ND(C,X)). Thus, in this example, D(X,Y) is equal to the sum of ND(A,Y), ND(B,Y) and ND(C,X) divided by three.

The in-building AP localizer 121 may store the calculated distance between access points 401X and 401Y, as well as calculated distances between other access points, in access point distance information 400. The in-building AP localizer 121 may then use the access point distance information 400 and the neighboring AP information 300 to compute AP relative position information 410. Some example techniques for computing the AP relative position information 410 will now be described in detail with reference to FIGS. 5-8. First, a set of access points may be determined that are co-located on a single floor of a building. In some examples, this may be determined based on group information 201. As described above, detected access points may be assigned to the groups. For example, if a given computing device sends and receives data via a given access point, then that access point may be assigned to the same group as the given device. Additionally, group information 201 may include device registration and/or account information, which may include a street address associated with an owner of the account. In some examples, the street address may include a floor number or another number (e.g., apartment number) that is indicative of a floor number. For example, an apartment number such as "Apartment 1601F" may be assumed to be on the sixteenth floor of a building. Each access point that is assigned to a group may therefore be determined to be on the same floor as the respective group to which it is assigned.

Figure 5:
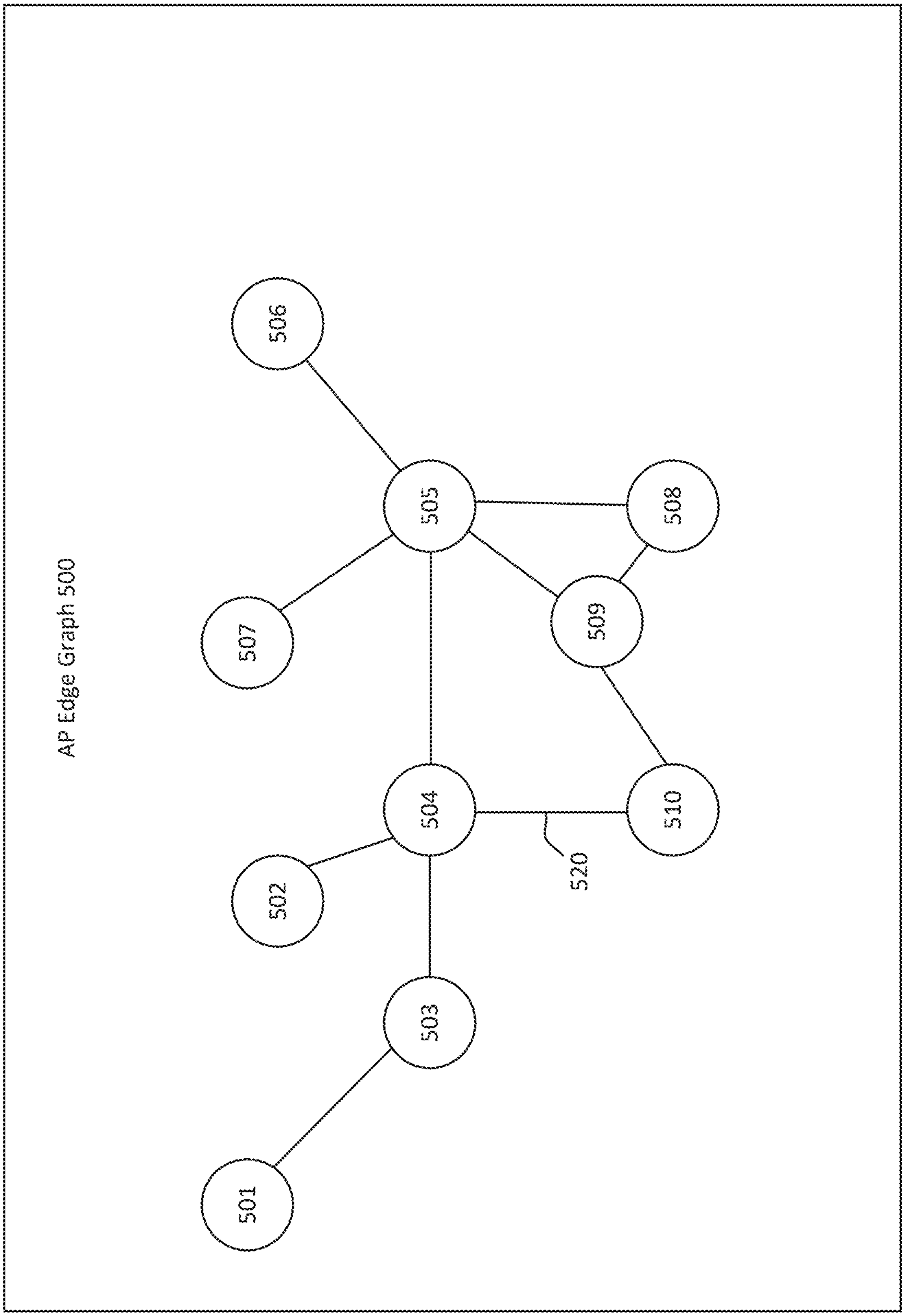
FIG. 5 is a diagram illustrating an example access point edge graph that may be used in accordance with the present description.

Referring now to FIG. 5, an example of an access point (AP) edge graph 500 will now be described in detail. In the example of FIG. 5, access points 501-510 are co-located on the same floor. Thus, access points 501-510 are a set of same-floor access points. For a set of same-floor access points (e.g., access points 501-510), access point edge graph 500 may be generated that shows neighboring access points using edges 520 that connect each pair of neighboring access points. Thus, in FIG. 5, the edges 520 are the lines that connect each of access points 501-510 to another one of access points 501-510. The access point edge graph 500 may then be used to calculate an access point position graph 600 of FIGS. 6-8.

Figure 6:
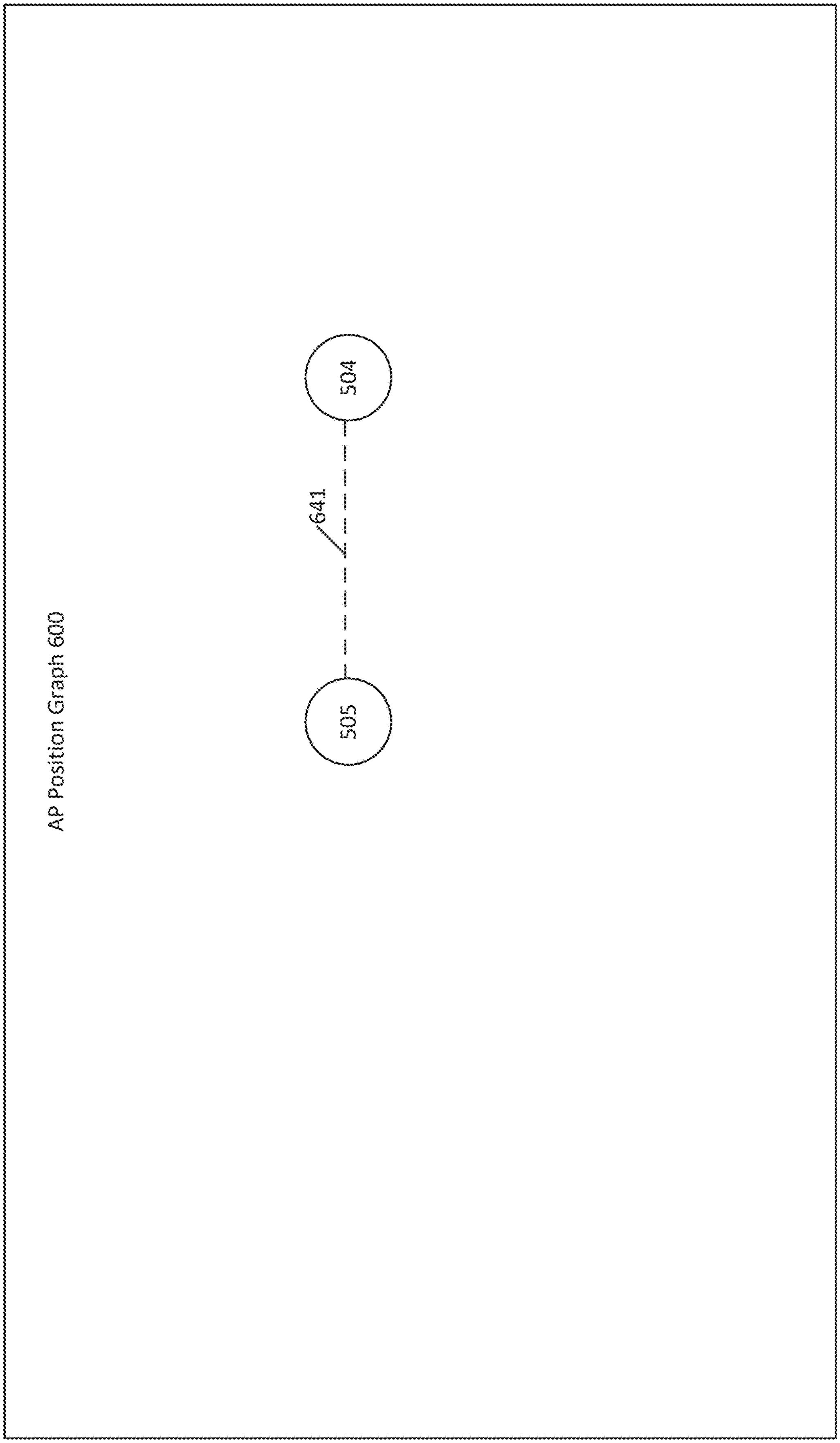
FIG. 6 is a diagram illustrating a first example access point position graph that may be used in accordance with the present description.

Specifically, a selected access point may be determined that has a most neighboring access points of all of access points 501-510 in the set of same-floor access points. In the example of FIG. 5, access point 505 has the most neighboring access points of all of access points 501-510. Specifically, access point 505 has five neighboring access points, including access points 504, 506, 507, 508 and 509. Thus, in this example, access point 505 is the selected access point. The selected access point (access point 505) may then be placed at a selected position (e.g., the origin) on the access point position graph 600. Referring now to FIG. 6, it is shown that access point 505 has been placed at a selected position (e.g., the origin) of the access point position graph 600.

A first neighbor wireless access point may then be determined that has a most neighboring wireless access points of all neighbors of the selected wireless access point. In the example of FIG. 5, it is shown that access point 505 has five neighbors, which include access points 504, 506, 507, 508 and 509. Of these five neighbors, access point 504 has the most neighboring access points. Specifically, access point 504 has four neighboring access points, including access points 502, 503, 505 and 510. Thus, in this example, access point 504 is the first neighbor wireless access point. The first neighbor wireless access point may be placed at a first position on the access point position graph 600. Referring again to FIG. 6, it is shown that access point 504 has been placed at a first position on the access point position graph 600. In FIG. 6, dashed line 641 indicates a first graph distance between the selected position (the position of access point 505) and the first position (the position of access point 504). The first graph distance may be representative of a first actual distance between the selected wireless access point and the first neighbor wireless access point. For example, the first graph distance may have a length determined by a scale of the access point position graph 600 to correspond to the first actual distance.

A second neighbor wireless access point may then be determined that has a next-most (e.g., second-most) neighboring wireless access points of all the neighbors of the selected wireless access point. In the example of FIG. 5, it is shown that access point 505 has five neighbors, which include access points 504, 506, 507, 508 and 509. Of these five neighbors, access point 509 has the second-most neighboring access points. Specifically, access point 509 has three neighboring access points, including access points 505, 508 and 510. Thus, in this example, access point 509 is the second neighbor wireless access point. It may then be determined whether the second neighbor wireless access point neighbors the first neighbor wireless access point. The second neighbor wireless access point may then be placed at a second position on the access point position graph 600 based on whether the second neighbor wireless access point neighbors the first neighbor wireless access point. A second graph distance between the selected position and the second position is representative of a second actual distance between the selected wireless access point and the second neighbor wireless access point. For example, the second graph distance may have a length determined by a scale of the access point position graph 600 to correspond to the second actual distance.

Figure 7:
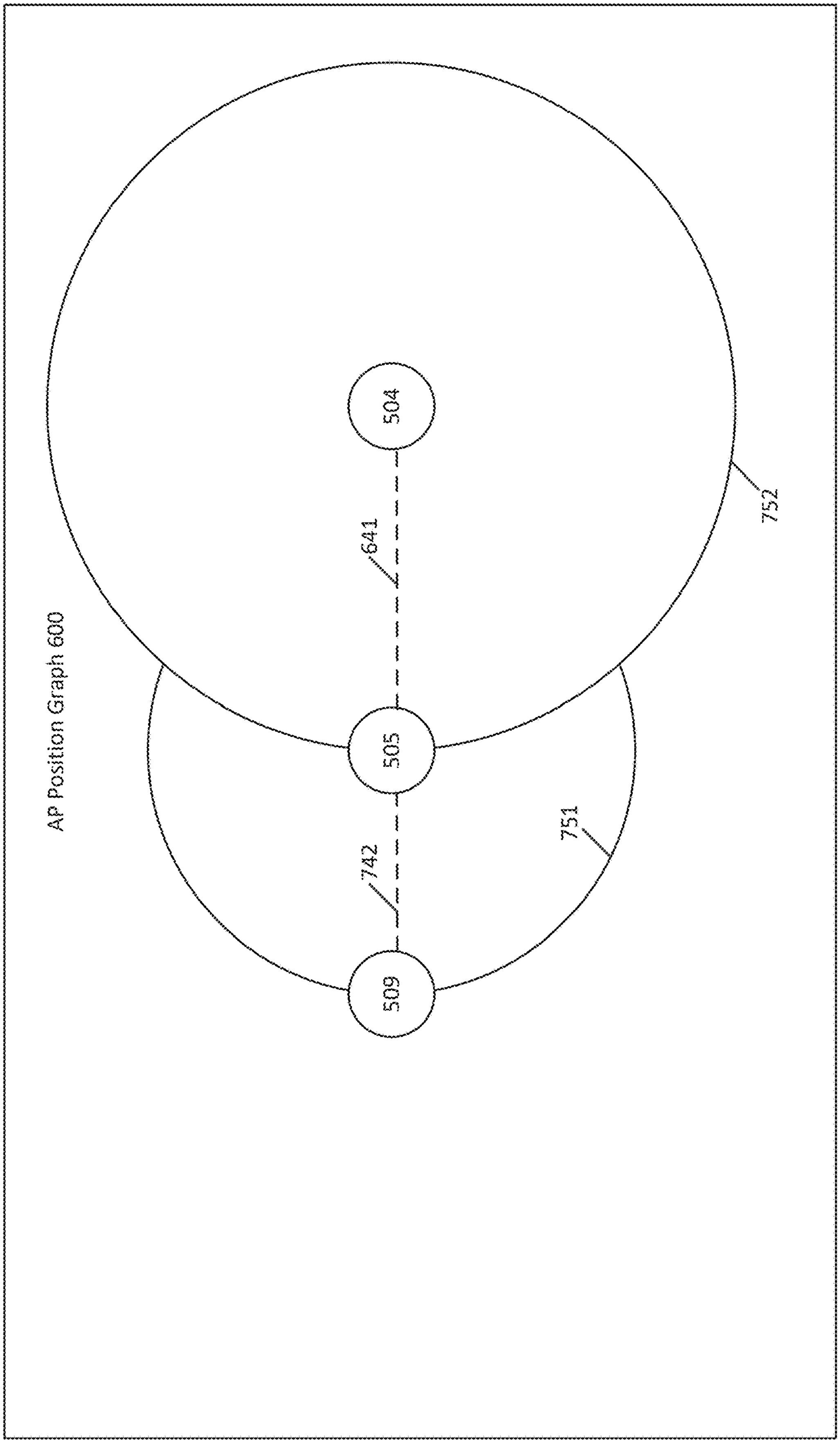
FIG. 7 is a diagram illustrating a second example access point position graph that may be used in accordance with the present description.

In the example of FIG. 5, the second neighbor wireless access point (e.g., access point 509) doesn't neighbor the first neighbor wireless access point (e.g., access point 504). In this scenario, the second position may be determined as follows. Specifically, and with reference now to FIG. 7, a first circle (e.g., circle 751) may be computed that surrounds the selected wireless access point (e.g., access point 505) at the second graph distance. In FIG. 7, dashed line 742 indicates the second graph distance. In the example of FIG. 7, the first circle (e.g., circle 751) surrounds the selected wireless access point (e.g., access point 505) at the second graph distance, which is represented by dashed line 742. Additionally, a second circle (e.g., circle 752) may be computed that surrounds the first neighbor wireless access point (e.g., access point 504) at a third graph distance representative of a furthest distance between the first neighbor wireless access point and all of its neighboring wireless access points. In this example, access point 505 is further away from the first neighbor wireless access point (e.g., access point 504) than any of its other neighboring access points (e.g., access points 502, 503 and 510). Thus, in this example, the third graph distance represents the distance between the first neighbor wireless access point (e.g., access point 504) and its furthest neighbor (e.g., access point 505). Accordingly, in this example, dashed line 641 also represents the third graph distance. As shown, circle 752 surrounds the first neighbor wireless access point (e.g., access point 504) at the third graph distance (represented by dashed line 641). The second position may then be selected as a point on the first circle (e.g., circle 751) that is on a portion of the first circle that is not within the second circle (e.g., circle 752). In this example, the portion of the first circle (e.g., circle 751) that is within the second circle (e.g., circle 752) is obstructed by the second circle and is therefore not shown in FIG. 7. Thus, in this example, the second neighboring access point (e.g., access point 509) may be placed on any of the visible portions of circle 751. In the example of FIG. 7, the second neighboring access point (e.g., access point 509) is initially placed on circle 751 horizontally to the left of access point 505. It is noted that access point 509 may optionally be moved along the visible portion of circle 751 if necessary to adjust for subsequent access point placements.

The above-described techniques may then be re-applied to iterate through remaining access points in the access point edge graph 500 that are not yet placed in the access point position graph 600. For example, the above-described neighbor placement techniques may be repeated for all neighboring access points of the selected access point that have at least two neighbors, then for a new selected access point and all its neighbors having at least two neighbors, and then finally for all access points having only one neighbor. For example, referring back to FIG. 5, it may be determined which remaining unplaced neighbor of access point 505 (the current selected access point) has the most neighboring access points. In this example, because access points 504 and 509 are already placed, there are three remaining unplaced neighbors of access point 505, which include access points 506, 507 and 508. Of this group, access point 508 has the most neighbors. Specifically, access point 508 has two neighbors, which include access points 505 and 509.

Figure 8:
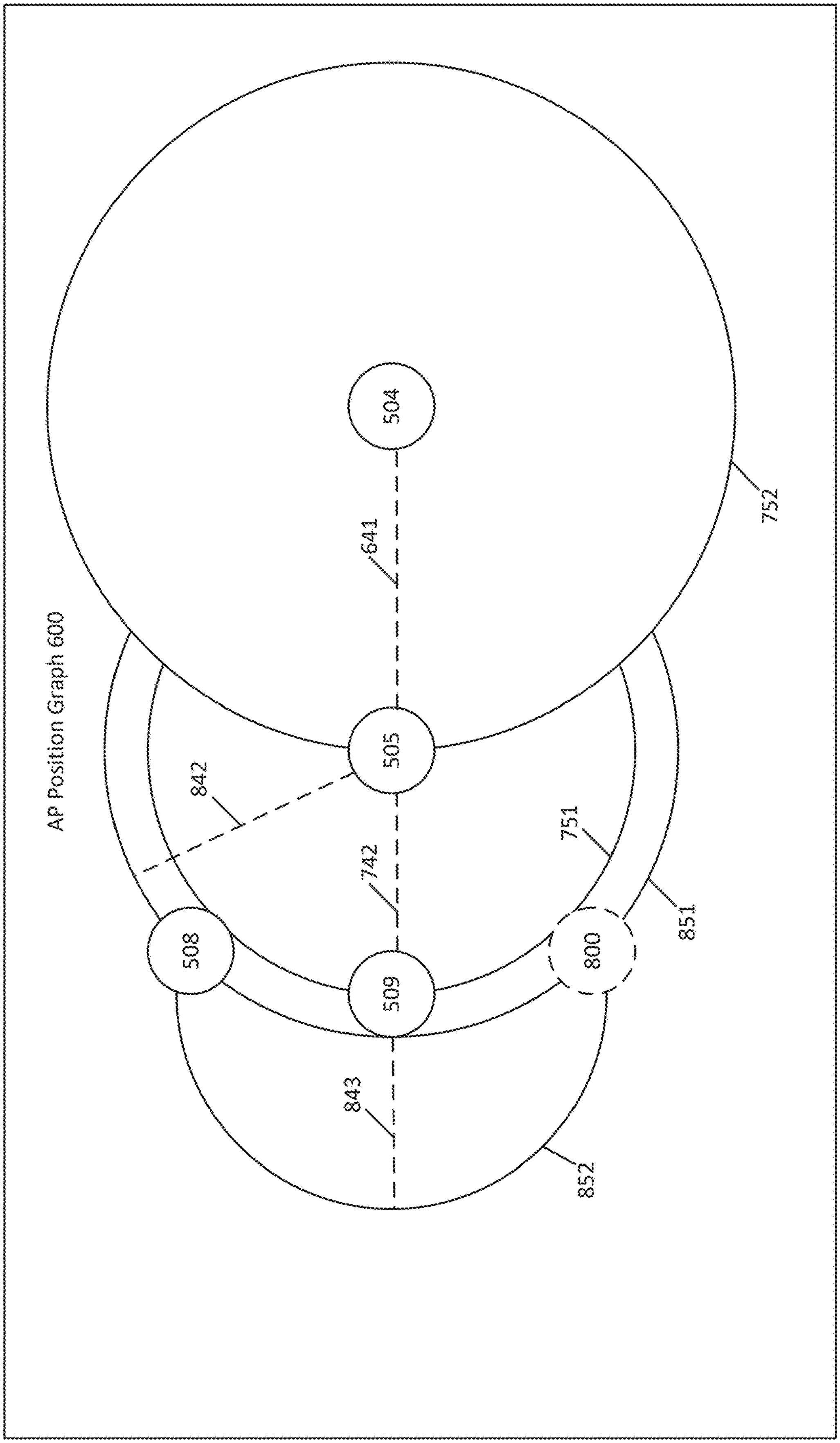
FIG. 8 is a diagram illustrating a third example access point position graph that may be used in accordance with the present description.

Referring now to FIG. 8, a placement for access point 508 will now be described in detail. In the example of FIG. 8, access point 508 becomes the new second neighboring access point. Additionally, in the example of FIG. 8, access point 509 (the former second neighboring access point from the example of FIG. 7) now becomes the new first neighboring access point. It may then be determined whether the second neighbor wireless access point (e.g., access point 508) neighbors the first neighbor wireless access point (e.g., access point 509). The second neighbor wireless access point may then be placed at a second position on the access point position graph 600 based on whether the second neighbor wireless access point neighbors the first neighbor wireless access point. A second graph distance between the selected position and the second position is representative of a second actual distance between the selected wireless access point and the second neighbor wireless access point.

In the example of FIG. 8, the second neighbor wireless access point (e.g., access point 508) neighbors the first neighbor wireless access point (e.g., access point 509). In this scenario, the second position may be determined as follows. Specifically, a first circle (e.g., circle 851) may be computed that surrounds the selected wireless access point (e.g., access point 505) at the second graph distance. In the example of FIG. 8, dashed line 842 indicates the second graph distance. Thus, in the example of FIG. 8, the first circle (e.g., circle 851) surrounds the selected wireless access point (e.g., access point 505) at the second graph distance, which is represented by dashed line 842. Additionally, a second circle (e.g., circle 852) may be computed that surrounds the first neighbor wireless access point (e.g., access point 509) at a third graph distance representative of a third actual distance between the first neighbor wireless access point and the second neighbor wireless access point (e.g., access point 508). In the example of FIG. 8, dashed line 843 indicates the third graph distance. Thus, in the example of FIG. 8, the second circle (e.g., circle 852) surrounds the first neighbor access point (e.g., access point 509) at the third graph distance, which is represented by dashed line 843. The second position may then be selected as one of two points of intersection between the first circle and the second circle. In the example of FIG. 8, the second position is selected as the upper point of intersection between circles 851 and 852, and access point 508 is placed at the upper point of intersection. Also, in this example, position 800 represents a lower point of intersection between circles 851 and 852. Although access point 508 is not placed at the position 800, the position 800 is shown in FIG. 8 with dashed lines to indicated that access point 508 could have optionally been placed at position 800 (instead of at the upper point of intersection).

The above-described techniques may then be re-applied to iterate through remaining access points in the access point edge graph 500 that are not yet placed in the access point position graph 600. For example, the above-described neighbor placement techniques may be repeated for all neighboring access points of the selected access point that have at least two neighbors, then for a new selected access point and all its neighbors having at least two neighbors, and then finally for all access points having only one neighbor. In this example, there are no remaining unplaced neighbors of the current selected access point (access point 505) that have at least two neighbors. Thus, a new selected access point may be determined, which is the remaining unplaced access point that has the most neighbors. In this example, the new selected access point may be access point 510, which has two neighbors (access points 504 and 509 as shown in FIG. 5). Although not shown in FIG. 8, access point 510 may then be placed on access point position graph 600. Because access point 510 is neighbors of both access points 509 and 504, it may be placed at an intersection of a circle surrounding access point 509 and a circle surrounding access point 504. In this example, it may be necessary to move access point 509 along the visible portion of circle 751 (e.g., clockwise or counter-clockwise), such as to ensure that access point 510 is placed far enough away from access point 505, which is not a neighbor of access point 510. It is also noted that moving access point 509 may also cause circle 852 to move with it, thereby causing the position of access point 508 to move accordingly to remain at the intersection of circle 851 and 852. After placing access point 510, the next remaining unplaced access point with the most neighbors will be access point 503, which may then be placed accordingly using the above-described techniques. After placing access point 503, the remaining unplaced access points (access points 501, 502 506 and 507) each have only a single neighbor. These single-neighbor access points may then each be placed accordingly using the above-described techniques.

It is noted that, after being placed at an initial position on an access point position graph 600, access points may be subsequently moved to different positions on the access point position graph 600 if necessary to adjust for subsequent access point placements. For example, as described above, access point 509 may be moved (e.g., clockwise or counter-clockwise) along the visible portion of circle 751, such as to ensure that access point 510 is placed far enough away from access point 505, which is not a neighbor of access point 510. It is also noted that moving access point 509 may also cause circle 852 to move with it, thereby causing the position of access point 508 to move accordingly to remain at the intersection of circle 851 and 852. As another example, it is described above that an access point (e.g., access point 508) may be placed at one of two points of intersection between circles (e.g., circles 851 and 852), In some examples, an access point that is initially placed at one of two circle intersection points (e.g., an upper intersection point) may subsequently be moved to another circle intersection point (e.g., a lower intersection point) between the same circles to assist with subsequent access point placements. For example, a first access point may be initially placed at an upper point of intersection between circles based on algorithms described above. However, a second access point that is not a neighbor of the first access point may subsequently be placed at a position that is very close to the upper point of intersection at which the first access point is initially placed. This may be problematic when the first and second and access points are not neighbors of one another. In this example, the first access point may be moved from the upper point of intersection between circles to the lower point of intersection between those same circles, such as to create a greater distance between the first access point and the second access point on the access point position graph 600 (e.g., to cause the non-neighboring first and second access points to be further apart from one another than any of their neighboring access points).

Figure 9:
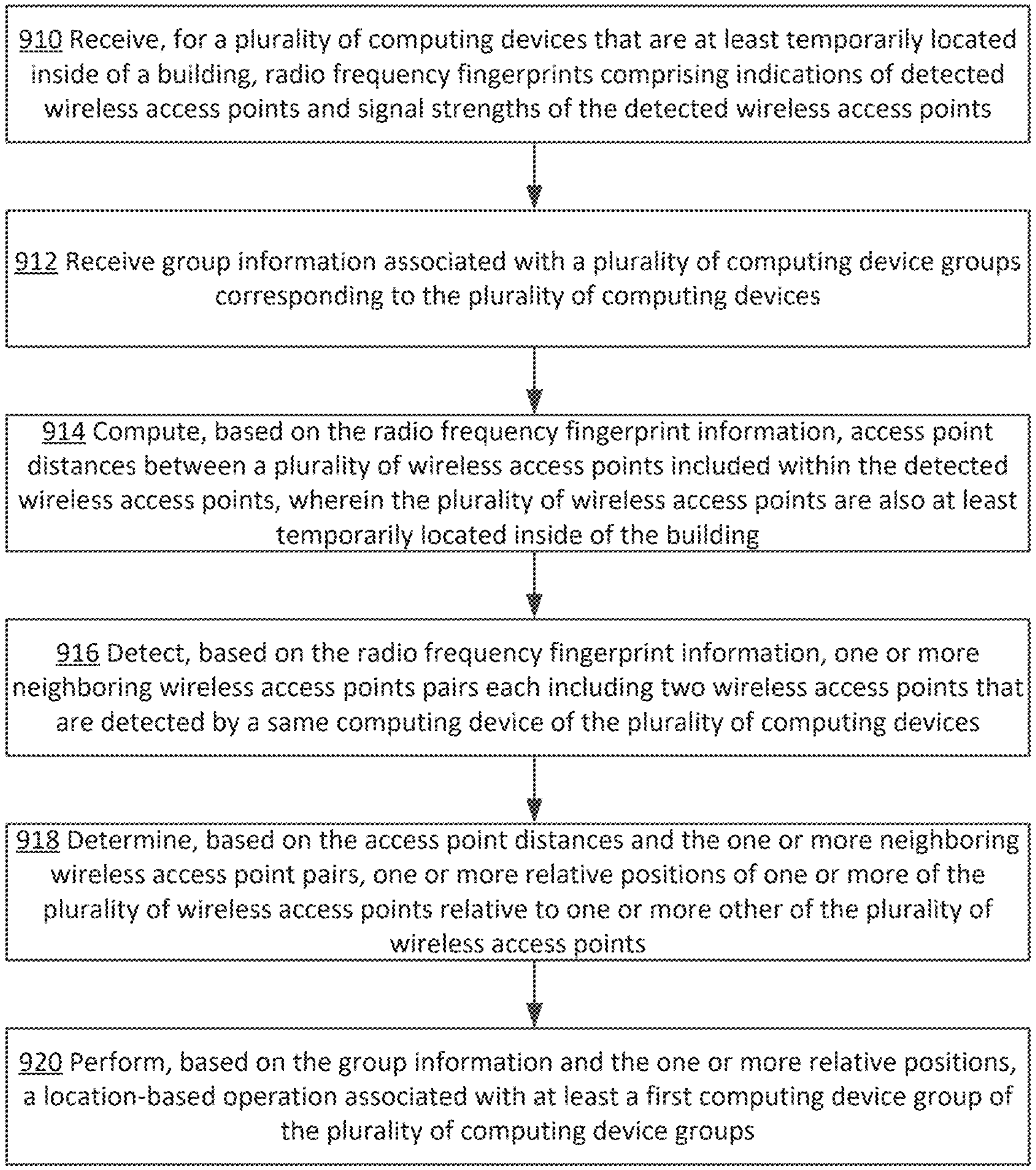
FIG. 9 is a flowchart illustrating an example in-building localization process that may be used in accordance with the present description.

FIG. 9 is a flowchart illustrating an example in-building localization process that may be used in accordance with the present description. At operation 910, RF fingerprints are received for a plurality of computing devices that are at least temporarily located inside of a building, and the RF fingerprints comprise indications of detected wireless access points and signal strengths of the detected wireless access points. For example, as shown in FIG. 1, RF fingerprints 102A-N may be received by in-building AP localizer 121, for example via one or more computing networks such as the Internet. As shown, RF fingerprint 102A includes indications of WI-FI access points that are detected by device 101A and indications of a received signal strength for each detected access point.

At operation 912, group information is received associated with a plurality of computing device groups corresponding to the plurality of computing devices. As described above with reference to FIG. 2, in addition to RF fingerprints 203, in-building AP localizer 121 may also receive group information 201 for a plurality of computing devices. The group information 201 may include information that allows the computing devices to be grouped according to a criterion. In some cases, the group information 201 may include device registration information and/or account information, and the device groups may correspond to accounts of owners of the devices. For example, the computing devices may be divided into groups, with each group corresponding to a respective account and including computing devices that belong to (e.g., are registered to) the respective account. In one specific example, when registering a computing device, a device owner may register the device to the owner's respective account with an online marketplace or other goods purchasing and delivery service. The in-building AP localizer 121 may use the RF fingerprints 203 and the group information 201 to divide computing devices into groups. The in-building AP localizer 121 may also generate a group data structure 202 for each group that includes data for the corresponding group. Detected access points may also be assigned to the groups. For example, if a given computing device sends and receives data via a given access point, then that access point may be assigned to the same group as the given device. Some example contents of group data structure 202 are shown in FIG. 2. In this example, group data structure 202 includes a building identifier (ID) and floor number for the group. For example, in some cases, group information 201 may include device registration information and/or account information, which may include a street address associated with an owner of the account. This information may be used to determine a building identifier and a floor number for an account to which the group corresponds. Specifically, a building identifier may map to a particular street address. Additionally, a street address may include a floor number or another number (e.g., apartment number) that is indicative of a floor number. The group data structure 202 also includes a group ID, which is an identifier for the corresponding group. The group data structure 202 also includes a list of home WI-FI access points, which are WI-FI access points that are assigned to the group (e.g., that belong to the account to which the group corresponds). The group data structure 202 also includes a list of each device that is included in the corresponding group. The group data structure 202 also includes RF fingerprint information for each device, including the device serial number (DSN), device type, timestamp for the RF fingerprint, and detected access point MAC address and signal strength.

At operation 914, access point distances between a plurality of wireless access points included within the detected wireless access points are computed, based on the radio frequency fingerprint information, wherein the plurality of wireless access points are also at least temporarily located inside of the building. Specifically, the RSS values for each access point may be used to compute an estimated distance between each device and the wireless access points detected by the device. The estimated device-to-access point distances may then be used to determine a closest computing device to each access point and to determine a minimum device distance, which is the distance between a wireless access point and its closest computing device. Additionally, an average minimum device distance may be computed, which is the average distance between an access point and each device that satisfies a distance constraint for the access point. The devices that satisfy the distance constraint include the closest device to the access point and all other devices whose distance to the access point does not exceed the minimum device distance by more than a configurable threshold distance. Furthermore, a normalized device distance between a given access point and a given device may be computed by dividing the estimated distance between the device and the access point by the average minimum device distance for the access point. An estimated distance between first and second access points may then be computed based on the normalized device distances. In particular, the estimated distance between access points may be calculated as an average of the sum of the normalized device distances from the second access point for devices that satisfy the distance constraint for the first access point and the sum of the normalized device distances from the first access point for devices that satisfy the distance constraint for the second access point. In distance computation 450 of FIG. 4, the distance between access points 401X and 401Y is represented by the notation D(X,Y). The normalized device distance (ND) between device 411A and access point 401Y is represented by the notation ND(A,Y). The normalized device distance (ND) between device 411B and access point 401Y is represented by the notation ND(B,Y). The normalized device distance (ND) between device 411C and access point 401X is represented by the notation ND(C,X). Thus, in this example, the distance between access points 401X and 401Y (which is D(X,Y)) is estimated as the an average of the sum of the normalized device distances from access point 401Y for devices that satisfy the distance constraint for the access point 401X (which includes ND(A,Y) and ND(B,Y)) and the sum of the normalized device distances from the access point 401X for devices that satisfy the distance constraint for the access point 401Y (which includes ND(C, X)). Thus, in this example, D(X,Y) is equal to the sum of ND(A,Y), ND(B,Y) and ND(C,X) divided by three.

At operation 916, one or more neighboring wireless access point pairs are detected each including two wireless access points that are detected by a same computing device of the plurality of computing devices. The one or more neighboring wireless access points pairs are detected based on the radio frequency fingerprint information. To detect the neighboring wireless access points pairs, the in-building AP localizer 121 may examine the incoming RF fingerprints to identify RF fingerprints from different devices that identify the same access point, such as by indicating the same MAC address. When two different devices have RF fingerprints that indicate detection of the same access point (e.g., that identify the same MAC address) as one another, then these may be detected as neighboring access points.

At operation 918, one or more relative positions of one or more of the plurality of wireless access points relative to one or more other of the plurality of wireless access points are determined, based on the access point distances and the one or more neighboring wireless access point pairs. Some example techniques for performing this operation are described in detail above with reference to FIGS. 5-8 and are not repeated here. These example techniques are also described in detail below with reference FIG. 10, which depicts the example techniques in flowchart form.

At operation 920, a location-based operation associated with at least a first computing device group of the plurality of computing device groups is performed based at least in part on the one or more relative positions. In some examples, the location-based operation associated with at least a first computing device group of the plurality of computing device groups may be performed based at least in part on the relative position and the group information. Additionally, in some examples, the performing of the location-based operation may comprise guiding a delivery person to an in-building delivery location associated with the first computing device group. For example, in some cases, a delivery person may receive an address for an in-building delivery location, such as a given apartment number or room number within a building. However, the delivery person may be unable to ascertain, from the address, exactly where inside the building a given room or apartment is located. Additionally, the delivery person may not know the best way to navigate through the building to the delivery address or the most efficient order in which to make multiple deliveries to multiple locations within the building. This problem may be amplified when the delivery person is making multiple deliveries inside a large building. The techniques described herein may use the computed relative positions between access points to guide a delivery person to a given address within the building. For example, based on stored group data (e.g., group data structure 202), a location service 120 may determine an access point associated with a given computing device group that corresponds to a delivery address. The delivery person may operate a computing device that may provide an RF fingerprint to the location service 120, which may allow the computing service 120 to determine the delivery person's current location in a building, such as based on received signal strengths of detected access points. For example, the location service 120 may determine a current closest access point that is closest to a delivery person's current location. The location service 120 may then determine a destination access point associated with a delivery address. The location service 120 may then guide the delivery person from his or her current location to the delivery location based on a relative position of the destination access point relative to the current closest access point. This guidance operation may therefore be performed based at least in part on the relative position and the group information and may be associated with the computing device group corresponding to the delivery location (e.g., having the same customer account, building ID, floor number, apartment number, etc.).

As described above, the in-building access point locations may be used to guide a visitor, such as a delivery person, throughout a building. For example, for each package to be delivered inside a building, the location service may use the access point position information to project where in the building the respective delivery address falls. In some examples, the delivery person may operate a handheld device that may repeatedly scan and update the surrounding wireless environment and provide a list of detected access points to the location service. The location service may then use the list of detected access points to locate the delivery person's current location within the building. The location service may guide the delivery person to the proper building entrance. For example, the location service may send an instruction to the delivery person, e.g., "the delivery entrance is at the South-East side of the building, which is at your 5 clock, roughly 10 meters away." As the delivery person moves inside the building, the delivery person's physical pathway may be identified between the device groups by the location service to further refine or build the physical pathways on the three-dimensional lattice. In some examples, the location service may instruct the delivery person when to turn and in which direction to turn. Also, in some examples, the location service may indicate a position for a delivery address relative to the delivery person's current position, such as a clock-number direction, a distance, and a number of floors away.

As another example of a location-based operation that may be performed at operation 920, a location of a new device may be inferred, and a configuration or context may be applied to the new device based on the inferred location. In some examples, a location of a new device may be inferred based at least in part on the one or more relative positions of access points that may be determined at operation 918. For example, when a new device connects to a given access point, the location of the new device may be inferred based at least in part on a location (e.g., relative position) of the given access point. The location-based operation may then include applying a configuration or context to the new device based on the inferred location.

In some examples, a wide variety of computing contexts and/or computing configurations may be applied based on an inferred location. For example, in some cases, a given area within a building (e.g., the west side of a building) may be known to include, or be adjacent to, a banking or financial institution. In this example, when a new device is detected that is inferred to be at this location, the new device could be automatically loaded with banking and financial applications and/or features. As another example, another given area within a building (e.g., the east side of a building) may be known to include, or be adjacent to, an arcade or video gaming center. In this example, when a new device is detected that is inferred to be at this location, notifications may be sent to the new device regarding options to access video gaming, video streaming and entertainment applications and/or features.

Figure 10:
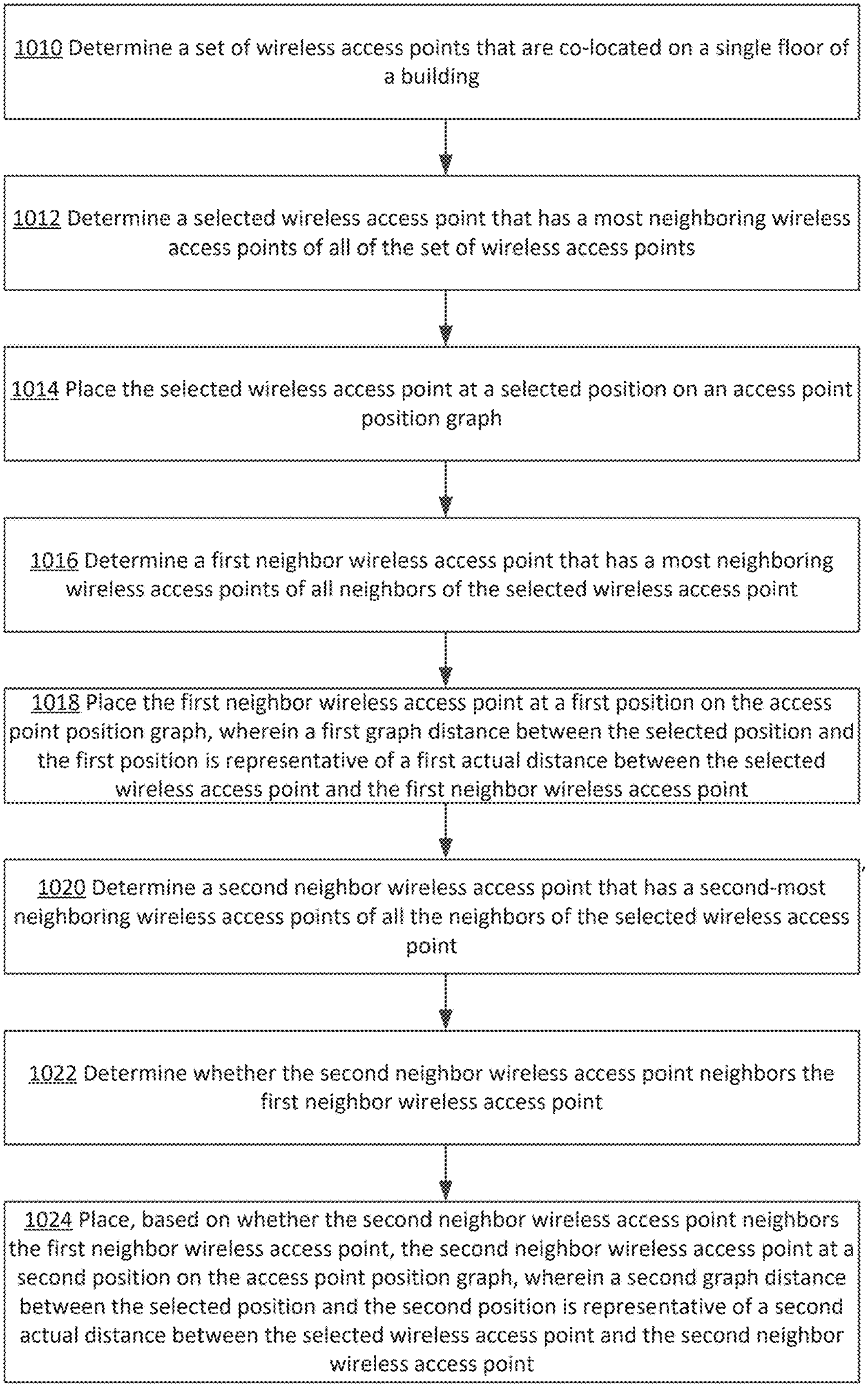
FIG. 10 is a flowchart illustrating an example access point relative position computation process that may be used in accordance with the present description.

FIG. 10 is a flowchart illustrating an example access point relative position computation process that may be used in accordance with the present description. In some examples, operations 1010-1024 of FIG. 10 may be performed as part of operation 918 of FIG. 9. Thus, in some examples, the determining of the one or more relative positions at operation 918 of FIG. 9 may include any, or all, of operations 1010-1024 of FIG. 10. At operation 1010, a set of wireless access points are determined that are co-located on a single floor of a building. The set of wireless access points may be included a plurality of wireless access points that are at least temporarily located inside a building. In some examples, the access points that are co-located on the same floor may be determined based on group information 201. As described above, detected access points may be assigned to the groups. For example, if a given computing device sends and receives data via a given access point, then that access point may be assigned to the same group as the given device. Additionally, group information 201 may include device registration and/or account information, which may include a street address associated with an owner of the account. In some examples, the street address may include a floor number or another number (e.g., apartment number) that is indicative of a floor number. For example, an apartment number such as "Apartment 1601F" may be assumed to be on the sixteenth floor of a building. Each access point that is assigned to a group may therefore be determined to be on the same floor as the respective group to which it is assigned.

At operation 1012, a selected wireless access point is determined that has a most neighboring wireless access points of all of the set of wireless access points. For example, as shown in FIG. 5, an AP edge graph may be generated that shows edges 520 which connect each pair of neighboring access points within access points 501-510. Thus, the selected wireless access point may be determined by counting the edges 520 extending from each of access points 501-510 and determining which access point has the most edges 520 extending from it. In the example, of FIG. 5, access point 505 may be determined as the selected wireless access point. As an another example, a list may be generated of neighboring access points for each of access points 501-510, and the selected access point may be determined by counting which of access points 501-510 has the most neighbors identified on the list. As described above with reference to operation 916 of FIG. 9, neighboring access points may be detected based on RF fingerprints, such as by detecting when an RF fingerprint indicates that two different access points are detected by the same device.

At operation 1014, the selected wireless access point is placed at a selected position (e.g., the origin) on an access point position graph. For example, as shown in FIG. 6, access point 505 is placed at a selected position (e.g., the origin) on access point position graph 600.

At operation 1016, a first neighbor wireless access point is determined that has a most neighboring wireless access points of all neighbors of the selected wireless access point. The first neighbor wireless access point may be determined by determining each neighbor of the selected access point (e.g., access point 505), which includes access points 504, 506, 507, 508 and 509. It may then be determined which of access points 504, 506, 507, 508 and 509 has the most edges 520 extending from it in AP edge graph 500. In the example, of FIG. 5, access point 504 may be determined as the first neighbor wireless access point.

At operation 1018, the first neighbor wireless access point may be placed at a first position on the access point position graph, wherein a first graph distance between the selected position and the first position is representative of a first actual distance between the selected wireless access point and the first neighbor wireless access point. For example, referring back to FIG. 6, it is shown that access point 504 has been placed at a first position on the access point position graph 600. In FIG. 6, dashed line 641 indicates a first graph distance between the selected position (the position of access point 505) and the first position (the position of access point 504). The first graph distance may be representative of a first actual distance between the selected wireless access point and the first neighbor wireless access point. For example, the first graph distance may have a length determined by a scale of the access point position graph 600 to correspond to the first actual distance.

At operation 1020, a second neighbor wireless access point is determined that has a second-most neighboring wireless access points of all the neighbors of the selected wireless access point. The second neighbor wireless access point may be determined by determining each neighbor of the selected access point (e.g., access point 505), which includes access points 504, 506, 507, 508 and 509. It may then be determined which of access points 504, 506, 507, 508 and 509 has the second-most edges 520 extending from it in AP edge graph 500. In the example, of FIG. 5, access point 509 may be determined as the second neighbor wireless access point.

At operation 1022, it is determined whether the second neighbor wireless access point neighbors the first neighbor wireless access point. In some examples, this may be determined based on whether the first neighbor wireless access point and the second neighbor wireless access point are connected by a single edge in AP edge graph 500. If so, then the first neighbor wireless access point and the second neighbor wireless access point are neighbors. If not, then the first neighbor wireless access point and the second neighbor wireless access point are not neighbors. In the example of FIG. 5, access point 509 and access point 504 are not neighbors of one another.

At operation 1024, the second neighbor wireless access point is placed at a second position on the access point position graph based on whether the second neighbor wireless access point neighbors the first neighbor wireless access point, wherein a second graph distance between the selected position and the second position is representative of a second actual distance between the selected wireless access point and the second neighbor wireless access point. For example, the second graph distance may have a length determined by a scale of the access point position graph 600 to correspond to the second actual distance.

In some cases, it may be determined that the second neighbor wireless access point does not neighbor the first neighbor wireless access point. In this scenario, the second position may be determined as follows. Specifically, a first circle may be computed that surrounds the selected wireless access point at the second graph distance. A second circle may be computed that surrounds the first neighbor wireless access point at a third graph distance representative of a furthest distance between the first neighbor wireless access point and all of its neighboring wireless access points. The second position may then be selected as a point on the first circle that is on a portion of the first circle that is not within the second circle. For example, and referring back to FIG. 7, a first circle (e.g., circle 751) may be computed that surrounds the selected wireless access point (e.g., access point 505) at the second graph distance. In FIG. 7, dashed line 742 indicates the second graph distance. In the example of FIG. 7, the first circle (e.g., circle 751) surrounds the selected wireless access point (e.g., access point 505) at the second graph distance, which is represented by dashed line 742. Additionally, a second circle (e.g., circle 752) may be computed that surrounds the first neighbor wireless access point (e.g., access point 504) at a third graph distance representative of a furthest distance between the first neighbor wireless access point and all of its neighboring wireless access points. In this example, access point 505 is further away from the first neighbor wireless access point (e.g., access point 504) than any of its other neighboring access points (e.g., access points 502, 503 and 510). Thus, in this example, the third graph distance represents the distance between the first neighbor wireless access point (e.g., access point 504) and its furthest neighbor (e.g., access point 505). Accordingly, in this example, dashed line 641 also represents the third graph distance. As shown, circle 752 surrounds the first neighbor wireless access point (e.g., access point 504) at the third graph distance (represented by dashed line 641). The second position may then be selected as a point on the first circle (e.g., circle 751) that is on a portion of the first circle that is not within the second circle (e.g., circle 752). In this example, the portion of the first circle (e.g., circle 751) that is within the second circle (e.g., circle 752) is obstructed by the second circle and is therefore not shown in FIG. 7. Thus, in this example, the second neighboring access point (e.g., access point 509) may be placed on any of the visible portions of circle 751. In the example of FIG. 7, the second neighboring access point (e.g., access point 509) is initially placed on circle 751 horizontally to the left of access point 505. It is noted that access point 509 may optionally be moved along the visible portion of circle 751 if necessary to adjust for subsequent access point placements.

In some other cases, it may be determined that the second neighbor wireless access point does neighbor the first neighbor wireless access point. In this scenario, the second position may be determined as follows. Specifically, a first circle may be computed that surrounds the selected wireless access point at the second graph distance. A second circle may be computed that surrounds the first neighbor wireless access point at a third graph distance representative of a third actual distance between the first neighbor wireless access point and the second neighbor wireless access point. The second position may then be selected as one of two points of intersection between the first circle and the second circle. Referring back to FIG. 8, a placement for access point 508 is described. In the example of FIG. 8, because access point 509 has already been placed on the AP position graph 600, access point 508 becomes the new second neighboring access point. Additionally, in the example of FIG. 8, access point 509 (the former second neighboring access point from the example of FIG. 7) now becomes the new first neighboring access point. In the example of FIG. 8, the second neighbor wireless access point (e.g., access point 508) neighbors the first neighbor wireless access point (e.g., access point 509). In this scenario, the second position may be determined as follows. Specifically, a first circle (e.g., circle 851) may be computed that surrounds the selected wireless access point (e.g., access point 505) at the second graph distance. In the example of FIG. 8, dashed line 842 indicates the second graph distance. Thus, in the example of FIG. 8, the first circle (e.g., circle 851) surrounds the selected wireless access point (e.g., access point 505) at the second graph distance, which is represented by dashed line 842. Additionally, a second circle (e.g., circle 852) may be computed that surrounds the first neighbor wireless access point (e.g., access point 509) at a third graph distance representative of a third actual distance between the first neighbor wireless access point and the second neighbor wireless access point (e.g., access point 508). In the example of FIG. 8, dashed line 843 indicates the third graph distance. Thus, in the example of FIG. 8, the second circle (e.g., circle 852) surrounds the first neighbor access point (e.g., access point 509) at the third graph distance, which is represented by dashed line 843. The second position may then be selected as one of two points of intersection between the first circle and the second circle. In the example of FIG. 8, the second position is selected as the upper point of intersection between circles 851 and 852, and access point 508 is placed at the upper point of intersection. Also, in this example, position 800 represents a lower point of intersection between circles 851 and 852. Although access point 508 is not placed at the position 800, the position 800 is shown in FIG. 8 with dashed lines to indicated that access point 508 could have optionally been placed at position 800 (instead of at the upper point of intersection).

The above-described techniques may then be re-applied to iterate through remaining access points in the access point edge graph 500 that are not yet placed in the access point position graph 600. For example, the above-described neighbor placement techniques may be repeated for all neighboring access points of the selected access point that have at least two neighbors, then for a new selected access point and all its neighbors having at least two neighbors, and then finally for all access points having only one neighbor. In this example, there are no remaining unplaced neighbors of the current selected access point (access point 505) that have at least two neighbors. Thus, a new selected access point may be determined, which is the remaining unplaced access point that has the most neighbors. In this example, the new selected access point may be access point 510, which has two neighbors (access points 504 and 509 as shown in FIG. 5). Although not shown in FIG. 8, access point 510 may then be placed on access point position graph 600. Because access point 510 is neighbors of both access points 509 and 504, it may be placed at an intersection of a circle surrounding access point 509 and a circle surrounding access point 504. In this example, it may be necessary to move access point 509 along the visible portion of circle 751 (e.g., clockwise or counter-clockwise), such as to ensure that access point 510 is placed far enough away from access point 505, which is not a neighbor of access point 510. It is also noted that moving access point 509 may also cause circle 852 to move with it, thereby causing the position of access point 508 to move accordingly to remain at the intersection of circle 851 and 852. After placing access point 510, the next remaining unplaced access point with the most neighbors will be access point 503, which may then be placed accordingly using the above-described techniques. After placing access point 503, the remaining unplaced access points (access points 501, 502 506 and 507) each have only a single neighbor. These single-neighbor access points may then each be placed accordingly using the above-described techniques.

The above process may then be repeated for each floor of a multi-story building, such as to construct a three-dimensional lattice representing the multi-story building. The three-dimensional lattice may include a plurality of horizontal slices, with each horizontal slice representing a respective floor/story of the multi-story building. Furthermore, in some examples, access point positions may be refined based on pairs of cross-floor neighboring access points, which are two neighboring access points on different floors of a building.

Moreover, in some examples, access point positions may be refined based on a true north or other known location, such as in scenarios in which one or more in-building access points neighbor a public access point or other access point with a known location. For example, in some cases, when an in-building access point neighbors an access point with a known location (e.g., a public access point), a distance between the in-building access point and the known location access point may be calculated, for example using the techniques described above with reference to operation 914 of FIG. 9. This distance may then be used to estimate an actual location of the in-building wireless access point that neighbors the known location access point. These estimates may be further refined when multiple in-building access points neighbor the known location access point.

Figure 11:
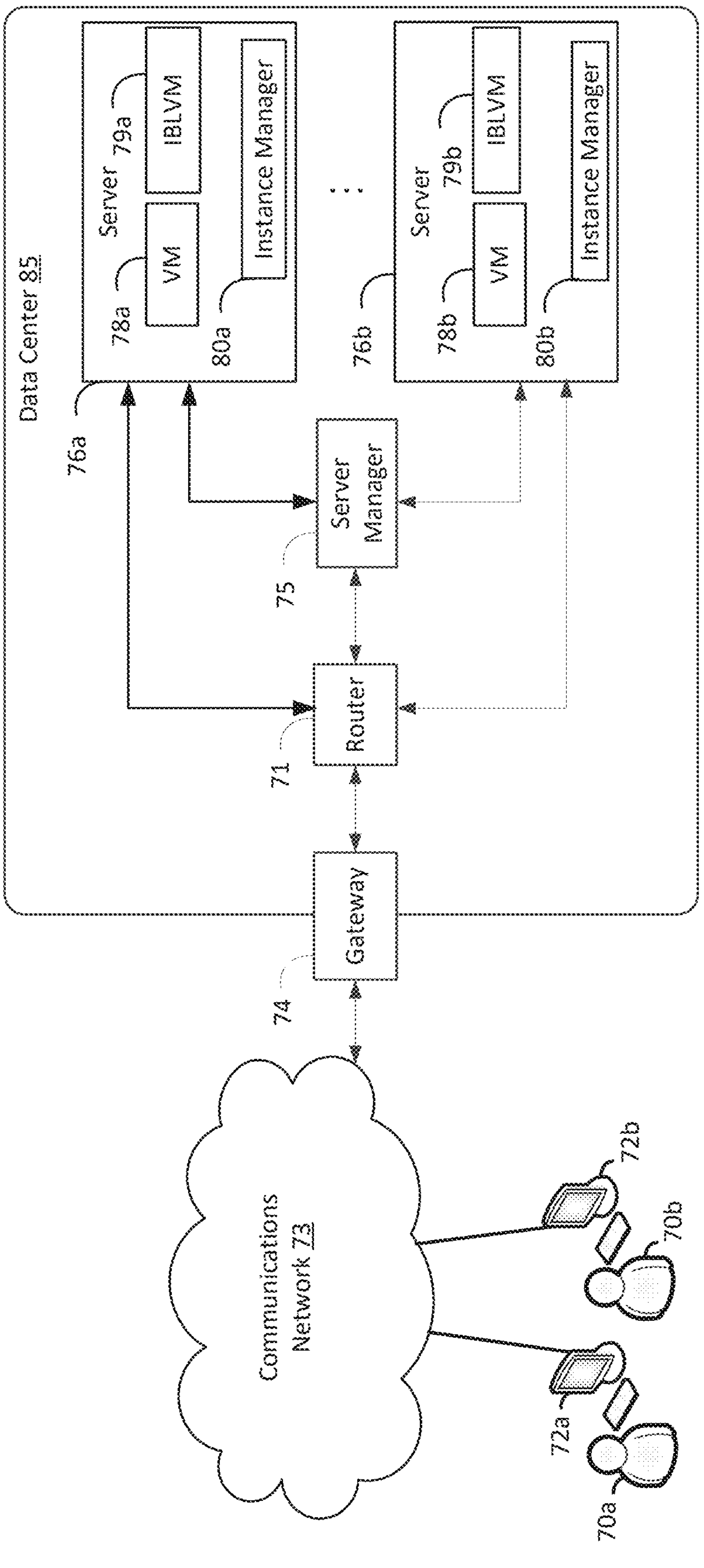
FIG. 11 is a diagram illustrating an example system for transmitting and providing data that may be used in accordance with the present description.

An example system for transmitting and providing data will now be described in detail. In particular, FIG. 11 illustrates an example computing environment in which the embodiments described herein may be implemented. FIG. 11 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-b* (which may be referred herein singularly as virtual machine instance 78 or in the plural as virtual machine instances 78). In this example, the resources also include in-building localization virtual machines (IBLVM's) 79*a-b*, which are virtual machines that are configured to execute any, or all, of the RF-fingerprint based in-building localization techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 11, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 11 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 11, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 11, a server manager 75 is also employed to at least in part direct various communications to, from and/or between servers 76*a* and 76*b*. While FIG. 11 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 11 has been greatly simplified and that many more networks and networking devices may be utilized to interconnect the various computing systems disclosed herein. These network topologies and devices should be apparent to those skilled in the art.

It should also be appreciated that data center 85 described in FIG. 11 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 12:
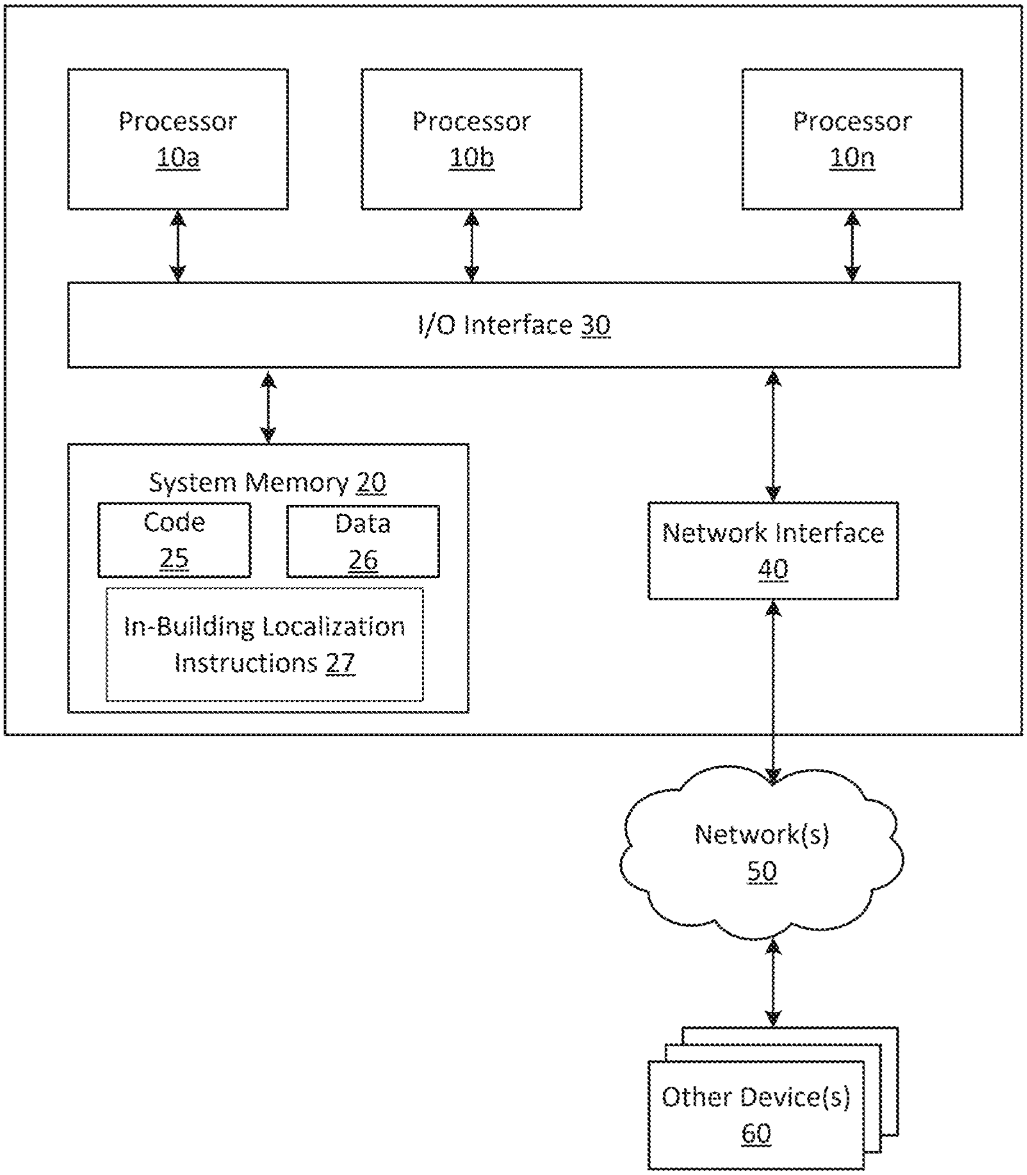
FIG. 12 is a diagram illustrating an example computing system that may be used in accordance with the present description.

In at least some embodiments, a server that implements a portion or all of one or more of the technologies described herein may include a computer system that includes or is configured to access one or more computer-accessible media. FIG. 12 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes in-building localization instructions 27, which are instructions for executing any, or all, of the RF-fingerprint based in-building localization techniques described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SAN (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:

one or more processors; and one or more memories having stored therein instructions that, upon execution by the one or more processors, cause the computing system to perform computing operations comprising:

receiving, for a plurality of computing devices that are at least temporarily located inside of a building, radio frequency fingerprints comprising indications of detected wireless access points and signal strengths of the detected wireless access points;

receiving group information associated with a plurality of computing device groups corresponding to the plurality of computing devices;

computing, based on the radio frequency fingerprints, access point distances between a plurality of wireless access points included within the detected wireless access points, wherein the plurality of wireless access points are also at least temporarily located inside of the building;

detecting, based on the radio frequency fingerprints, one or more neighboring wireless access point pairs each including two wireless access points that are detected by a same computing device of the plurality of computing devices;

determining, based on the access point distances and the one or more neighboring wireless access point pairs, one or more relative positions of one or more of the plurality of wireless access points relative to one or more other of the plurality of wireless access points; and performing, based at least in part on the one or more relative positions, a location-based operation associated with at least a first computing device group of the plurality of computing device groups.

2. The computing system of claim 1, wherein determining the one or more relative positions comprises:

determining a set of wireless access points included within the plurality of wireless access points and that are co-located on a single floor of a building;

determining a selected wireless access point that has a most neighboring wireless access points of all of the set of wireless access points; and placing the selected wireless access point at a selected position on an access point position graph.

3. The computing system of claim 2, wherein determining the one or more relative positions further comprises:

determining a first neighbor wireless access point that has a most neighboring wireless access points of all neighbors of the selected wireless access point; and placing the first neighbor wireless access point at a first position on the access point position graph, wherein a first graph distance between the selected position and the first position is representative of a first actual distance between the selected wireless access point and the first neighbor wireless access point.

4. The computing system of claim 3, wherein determining the one or more relative positions further comprises:

determining a second neighbor wireless access point that has a second-most neighboring wireless access points of all the neighbors of the selected wireless access point;

determining whether the second neighbor wireless access point neighbors the first neighbor wireless access point; and placing, based on whether the second neighbor wireless access point neighbors the first neighbor wireless access point, the second neighbor wireless access point at a second position on the access point position graph, wherein a second graph distance between the selected position and the second position is representative of a second actual distance between the selected wireless access point and the second neighbor wireless access point.

5. A computer-implemented method comprising:

receiving, for a plurality of computing devices, radio frequency fingerprints comprising indications of detected wireless access points and signal strengths of the detected wireless access points;

computing, based on the radio frequency fingerprints, access point distances between a plurality of wireless access points included within the detected wireless access points;

detecting, based on the radio frequency fingerprints, one or more neighboring wireless access point pairs each including two wireless access points that are detected by a same computing device of the plurality of computing devices;

determining, based on the access point distances and the one or more neighboring wireless access point pairs, one or more relative positions of one or more of the plurality of wireless access points relative to one or more other of the plurality of wireless access points; and performing, based at least in part on the one or more relative positions, a location-based operation.

6. The computer-implemented method of claim 5, wherein the plurality of computing devices and the plurality of wireless access points are at least temporarily located inside of a building.

7. The computer-implemented method of claim 5, wherein determining the one or more relative positions comprises:

determining a set of wireless access points included within the plurality of wireless access points and that are co-located on a single floor of a building;

determining a selected wireless access point that has a most neighboring wireless access points of all of the set of wireless access points; and placing the selected wireless access point at a selected position on an access point position graph.

8. The computer-implemented method of claim 7, wherein determining the one or more relative positions further comprises:

determining a first neighbor wireless access point that has a most neighboring wireless access points of all neighbors of the selected wireless access point; and placing the first neighbor wireless access point at a first position on the access point position graph, wherein a first graph distance between the selected position and the first position is representative of a first actual distance between the selected wireless access point and the first neighbor wireless access point.

9. The computer-implemented method of claim 8, wherein determining the one or more relative positions further comprises:

determining a second neighbor wireless access point that has a second-most neighboring wireless access points of all the neighbors of the selected wireless access point;

determining whether the second neighbor wireless access point neighbors the first neighbor wireless access point; and placing, based on whether the second neighbor wireless access point neighbors the first neighbor wireless access point, the second neighbor wireless access point at a second position on the access point position graph, wherein a second graph distance between the selected position and the second position is representative of a second actual distance between the selected wireless access point and the second neighbor wireless access point.

10. The computer-implemented method of claim 9, wherein it is determined that the second neighbor wireless access point does not neighbor the first neighbor wireless access point, and wherein the second position is determined by:

computing a first circle that surrounds the selected wireless access point at the second graph distance;

computing a second circle that surrounds the first neighbor wireless access point at a third graph distance representative of a furthest distance between the first neighbor wireless access point and all of its neighboring wireless access points; and selecting the second position as a point on the first circle that is on a portion of the first circle that is not within the second circle.

11. The computer-implemented method of claim 9, wherein it is determined that the second neighbor wireless access point neighbors the first neighbor wireless access point, and wherein the second position is determined by:

computing a first circle that surrounds the selected wireless access point at the second graph distance;

computing a second circle that surrounds the first neighbor wireless access point at a third graph distance representative of a third actual distance between the first neighbor wireless access point and the second neighbor wireless access point; and selecting one of two points of intersection between the first circle and the second circle as the second position.

12. The computer-implemented method of claim 5, wherein the performing of the location-based operation comprises guiding a delivery person to an in-building delivery location.

13. The computer-implemented method of claim 5, further comprising:

receiving group information associated with a plurality of computing device groups corresponding to the plurality of computing devices, wherein the location-based operation is associated with at least a first computing device group of the plurality of computing device groups.

14. One or more non-transitory computer-readable storage media having stored thereon computing instructions that, upon execution by one or more computing devices, cause the one or more computing devices to perform computing operations comprising:

receiving, for a plurality of computing devices, radio frequency fingerprints comprising indications of detected wireless access points and signal strengths of the detected wireless access points;

computing, based on the radio frequency fingerprints, access point distances between a plurality of wireless access points included within the detected wireless access points;

detecting, based on the radio frequency fingerprints, one or more neighboring wireless access point pairs each including two wireless access points that are detected by a same computing device of the plurality of computing devices;

determining, based on the access point distances and the one or more neighboring wireless access point pairs, one or more relative positions of one or more of the plurality of wireless access points relative to one or more other of the plurality of wireless access points; and performing, based at least in part on the one or more relative positions, a location-based operation.

15. The one or more non-transitory computer-readable storage media of claim 14, wherein determining the one or more relative positions comprises:

determining a set of wireless access points included within the plurality of wireless access points and that are co-located on a single floor of a building;

determining a selected wireless access point that has a most neighboring wireless access points of all of the set of wireless access points; and placing the selected wireless access point at a selected position on an access point position graph.

16. The one or more non-transitory computer-readable storage media of claim 15, wherein determining the one or more relative positions further comprises:

determining a first neighbor wireless access point that has a most neighboring wireless access points of all neighbors of the selected wireless access point; and placing the first neighbor wireless access point at a first position on the access point position graph, wherein a first graph distance between the selected position and the first position is representative of a first actual distance between the selected wireless access point and the first neighbor wireless access point.

17. The one or more non-transitory computer-readable storage media of claim 16, wherein determining the one or more relative positions further comprises:

determining a second neighbor wireless access point that has a second-most neighboring wireless access points of all the neighbors of the selected wireless access point;

determining whether the second neighbor wireless access point neighbors the first neighbor wireless access point; and placing, based on whether the second neighbor wireless access point neighbors the first neighbor wireless access point, the second neighbor wireless access point at a second position on the access point position graph, wherein a second graph distance between the selected position and the second position is representative of a second actual distance between the selected wireless access point and the second neighbor wireless access point.

18. The one or more non-transitory computer-readable storage media of claim 17, wherein it is determined that the second neighbor wireless access point does not neighbor the first neighbor wireless access point, and wherein the second position is determined by:

computing a first circle that surrounds the selected wireless access point at the second graph distance;

computing a second circle that surrounds the first neighbor wireless access point at a third graph distance representative of a furthest distance between the first neighbor wireless access point and all of its neighboring wireless access points; and selecting the second position as a point on the first circle that is on a portion of the first circle that is not within the second circle.

19. The one or more non-transitory computer-readable storage media of claim 17, wherein it is determined that the second neighbor wireless access point neighbors the first neighbor wireless access point, and wherein the second position is determined by:

computing a first circle that surrounds the selected wireless access point at the second graph distance;

computing a second circle that surrounds the first neighbor wireless access point at a third graph distance representative of a third actual distance between the first neighbor wireless access point and the second neighbor wireless access point; and selecting one of two points of intersection between the first circle and the second circle as the second position.

20. The one or more non-transitory computer-readable storage media of claim 14, wherein the performing of the location-based operation comprises guiding a delivery person to an in-building delivery location.

* * * * *